United States Patent Office 3,539,596
Patented Nov. 10, 1970

1

3,539,596
3-OXA-A,19-DINORSTEROIDS
Daniel Lednicer, Portage, Mich., assignor to The Upjohn Company, Kalamazoo, Mich., a corporation of Delaware
No Drawing. Filed Jan. 15, 1968, Ser. No. 697,578
Int. Cl. C07d 5/40
U.S. Cl. 260—346.2
9 Claims

ABSTRACT OF THE DISCLOSURE

This invention relates to novel 3-oxa-A-norsteroid compounds, intermediates therefor and processes for their preparation; more particularly to the racemic compounds of the formulae

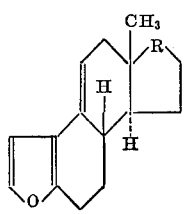

and

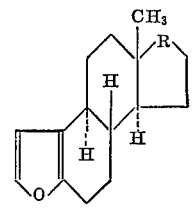

wherein R is selected from the group consisting of

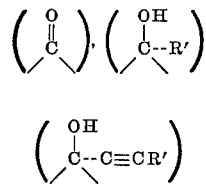

and $\left( \begin{array}{c} \text{OH} \\ \text{C--C}\equiv\text{CR}' \end{array} \right)$ wherein R' is selected from the group consisting of hydrogen and alkyl of from one through four carbon atoms, and the $d$ and $l$ forms and mixtures thereof.

BRIEF SUMMARY OF THE INVENTION

The novel compounds, intermediates therefor and processes for their production are illustratively represented by the following sequence of formulae:

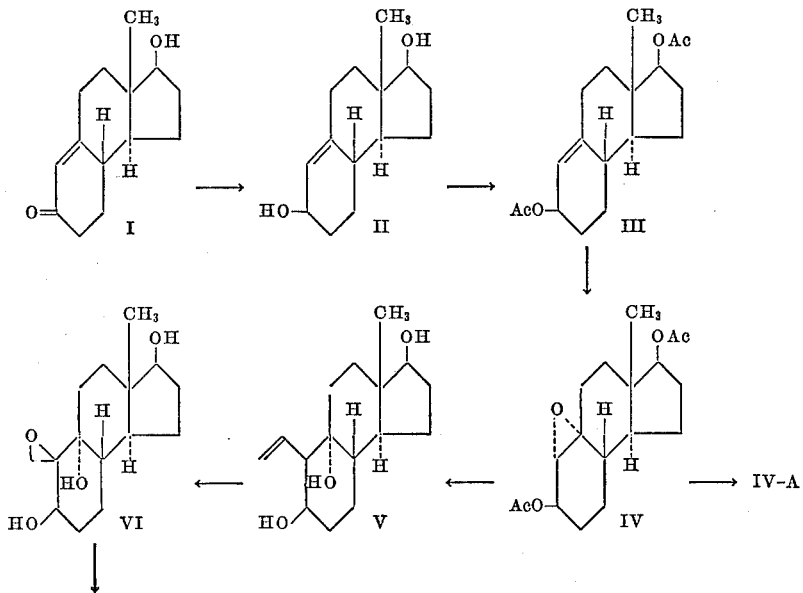

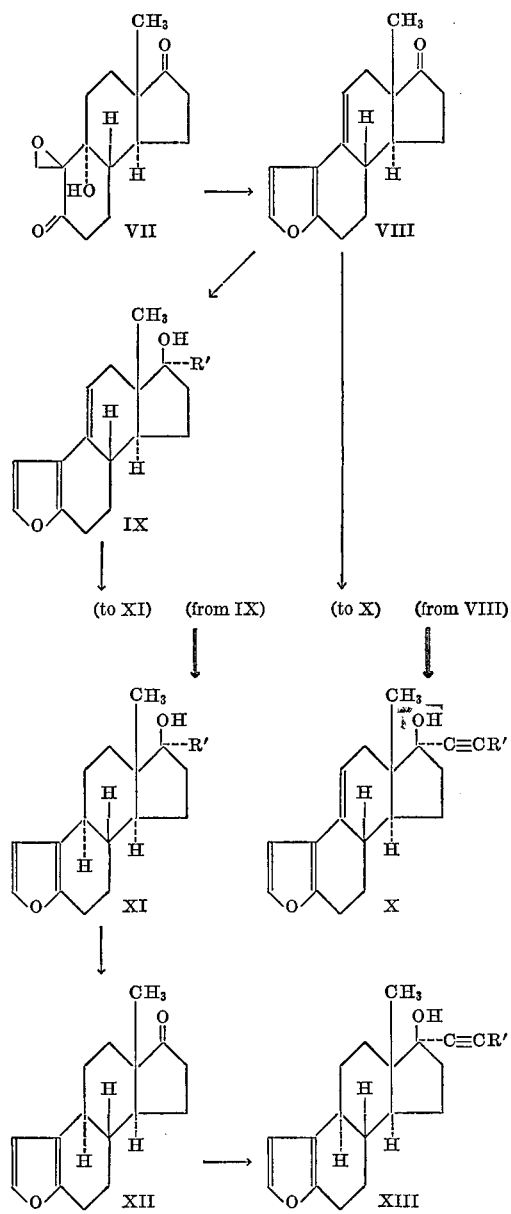

wherein Ac is the acyl radical of an organic carboxylic acid containing from one through twelve carbon atoms and R' is selected from the group consisting of hydrogen and alkyl of from one through four carbon atoms.

The novel compounds embraced by Formulae II through XIII of the flow-sheet, above, are prepared by the route shown therein, employing the methods and reactions described below. The novel products of Formulae VIII through XIII (as well as all of the other compounds set forth in the flow-sheet) represent racemic (dl) mixtures which can be separated into their d and l isomers by methods known in the art, e.g., J. Am. Chem. Soc. 61,974 and 62,824.

(1) The first step of the process involves the reduction of the 4-keto group of the known compound anti-trans-1β-hydroxy - 8β - methyl - 4,5 - (4 - keto - 1,2,3,4 - tetrahydrobenzo)hydrindane (I) (prepared as in J. Org. Chem. 26, 3904), namely, by treatment with a reducing agent such as lithium aluminum tritertiarybutoxy hydride or lithium aluminum hydride, to yield 2,3,3a,4,5,7,8,9,9aα, 9bα - decahydro - 3aβ - methyl - 1H - cyclopenta[α]naphthalene-3β,7β-diol (II).

(2) 3β,7β-diacylation of the thus produced compound of Formula II by known methods, e.g., by treatment with the desired hydrocarbon carboxylic acid anhydride in pyridine at from about 0° to 30° C., yields 2,3,3a,4,5,7,8, 9,9aβ,9bα - decahydro - 3aβ - methyl - 1H - cyclopenta[a] naphthalene-3β,7β-diol diacylate (III).

(3) A compound of Formula III is subjected to 5aα,6α-epoxidation by treatment with a peracid such as m-chloroperbenzoic acid, peracetic acid, perphthalic acid, trifluoroperacetic acid, etc., to yield 2,3,3a,4,5,7,8,9aβ,9bα-decahydro - 3aβ - methyl - 1H - cyclopenta[a]naphthalene - 3β, 7β-diol-5aα,6α-oxide diacylate (IV).

(4) Treatment of a compound of Formula IV with the alkenylmagnesium halide Grignard reagent vinylmagnesium bromide yields 2,3,3a,4,5,5a,6,7,8,9,9aβ,9bα-dodecahydro - 3aβ - methyl - 6β - vinyl - 1H - cyclopenta[a]naphthalene-3β,5α,7β-triol (V). When a compound of Formula IV is reacted with an alkylmagnesium halide, e.g., methylmagnesium bromide, 2,3,3a,4,5,6,7,8,9,9aβ,9bα-dodecahydro - 3aβ,6β - dimethyl - 1H - cyclopenta[a] - naphthalene-3β,5α,7β-triol (IV-A) is produced.

(5) Subjecting the compound of Formula V to epoxidation, e.g., by heating it with a peracid such as trifluoroperacetic acid, yields 2,3,3a,4,5,5a,6,7,8,9,9aβ,9bα-dodecahydro - 3aβ - methyl - 6β - oxiranyl - 1H - cyclopenta[a] naphthalene-3β,5α,7β-triol (VI).

(6) Oxidation of the 3β- and 7β-hydroxy groups of the compound of Formula VI, for example, by mixing it with chromic acid at low temperature, yields 1,2,3a,4,5,5a,8,9, 9aβ,9bα - decahydro - 5aα - hydroxy - 3aβ - methyl - 6β-oxiranyl - 3H - cyclopenta[a] - naphthalene - 3,7(6H) dione (VII).

(7) Rearrangement of the compound of Formula VII occurs on its treatment at moderate (room) temperature with a Lewis acid catalyst such as boron trifluoride (preferably as its ether solution), providing dl-3-oxa-A-norestra-1,5(10),9(11)-trien-17-one (VIII). The term "Lewis acid" is well known in the art and is defined succinctly by Fieser and Fieser, "Organic Chemistry," 3rd edition (Reinhold Publishing Corp., New York, 1956) on page 138 thereof. Examples of such compounds are hydrogen fluoride, boron trifluoride, arsenic trifluoride, phosphorous pentafluoride, titanium tetrafluoride, concentrated sulfuric acid, polyphosphoric acid and the like.

(8) The 17-carbonyl group of the compound of Formula VIII is readily reduced, e.g., with lithium aluminum tritertiarybutoxy hydride at moderate (room) temperature, to yield dl-3-oxa-A-norestra-1,5(10),9(11)-trien-17β-ol (IX).

The compounds of Formula IX wherein R' is alkyl (methyl, ethyl, propyl, butyl, etc.) can be prepared from the compound of Formula VIII by the known methods described in (a) and (b), below.

(a) By treating the 17-keto compound (VIII) with an alkyl lithium (e.g., methyl lithium, ethyl lithium, propyl lithium, butyl lithium, etc.) to yield a corresponding dl-3-oxa - A - norestra - 1,5(10),9(11) - trien - 17α - alkyl-17β-ol (IX). The reaction is conducted advantageously in the presence of an inert solvent such as ether, benzene, toluene, etc. The lithium compound is employed advantageously in excess of the stoichiometric proportion, preferably in an amount at least 1–5 moles per mole of starting material (VIII).

(b) By treating the compound of Formula VIII with an appropriate Grignard reagent, i.e., on alkyl magnesium halide such as methylmagnesium bromide, ethylmagnesium bromide, propylmagnesium bromide, butylmagnesium bromide, etc., in a solvent such as ether, tetrahydrofuran, benzene and the like, to produce a corresponding dl - 3 - oxa - A - norestra - 1,5(10),9(11) - trien - 17α-alkyl-17β-ol (IX). Preferably, the Grignard reagent is employed in an excess of the order of 10 moles per mole of starting material (VIII).

(9) The dl - 17α - alkynyl - 3 - oxa-A-norestra-1,5(10), 9(11)-trien-17β-ols of Formula X can be prepared from the 17-keto compound of Formula VIII by the known methods described in (a), (b) and (c), below.

(a) By reaction of the compound of Formula VIII with an alkynyl lithium-ethylene diamine complex (wherein alkynyl is ethynyl, 1-propynyl, 1-butynyl, 1-pentynyl, etc.) in such solvents as dimethylsulfoxide, dimethylformamide, tetrahydrofuran and the like to give a corresponding dl-17α-alkynyl-3-oxa-A-norestra-1,5(10),9(11)-trien-17β-ol (X).

(b) By treating the compound of Formula VIII with an alkali metal derivative such as sodium acetylide, potassium ocetylide, sodium or potassium methyacetylide, sodium or potassium ethylacetylide, sodium propylacetylide, sodium butylacetylide, etc., in the presence of an inert solvent such as dioxane, dimethylformamide or dimethylsulfoxide, to yield a corresponding dl-17α-alkynyl-3-oxa-A-norestra-1,5(10),9(11)-trien-17β-ol (X).

(c) By heating the compound of Formula VIII with an alkynylmagnesium halide (prepared by slowly passing a gas such as acetylene, methylacetylene, propylacetylene, butylacetylene, etc., through a tetrahydrofuran solution of an alkylmagnesium halide such as methylmagnesium bromide) in the presence of a solvent such as tetrahydrofuran, ether, benzene, etc., to yield a corresponding dl-17α-alkynyl-3-oxa-A-norestra-1,5(10),9(11)-trien-17β-ol (X).

(10) The 1,5(10),9(11)-trienes embraced by Formula IX [prepared as in (8), above] can be saturated at the 9(11)-position, for example, by treatment in an inert solvent with liquid ammonia to which an alkali metal, preferably lithium) is added, to yield the corresponding 1,5(10)-dienes (XI).

(11) The compound of Formula XI, wherein R' is hydrogen, can be oxidized at the 17β-position, e.g., by mixing it with chromic acid at low temperature to give dl-3-oxa-A-norestra-1,5(10)-dien-17-one (XII).

(12) The compound of Formula XII can be converted to the dl-17α-alkynyl-3-oxa-A-norestra-1,5(10)-dien-17β-ols of Formula XIII by employing the procedures described in (9), above, for preparing the dl-17α-alkynyl-3-oxa-A-norestra-1,5(10),9(11)-trien-17β-ols (X) from dl-3-oxa-A-norestra-1,5(10),9(11)-trien-17-one (VIII).

All of the compounds included within Formulae II through XIII of the flow-sheet, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, methanol, dilute methanol, ethanol, ether, methylene chloride and Skellysolve B (hexanes), mixtures and combinations of these solvents; also by gradient elution chromatography from an adsorbent column with a suitable mixture of solvents, such as, methylene chloride-Skellysolve B, acetone-Skellysolve B, and the like.

The compounds embraced by Formulae IV-A and VIII through XIII possess pharmacological activity and are useful as estrogenic, progestational and uterotropic agents in mammals, birds and other animals. The aforesaid compounds when administered conjoined with a standard estrogen (such as 17α-ethynylestradiol) act as anti-estrogens.

The compounds of Formulae IV-A and VIII through XIII of the invention can be prepared and administered to mammals, birds, and animals, in a wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, elixirs or aerosol spray. Either the pure d or l isomers or mixtures thereof can be used in such solid and liquid compositions.

DETAILED DESCRIPTION

It is to be understood that the invention is not to be limited to the exact details of operation or exact compounds shown and described herein, as obvious modifications and equivalents will be apparent to one skilled in the art and the invention is therefore to be limited only by the scope of the appended claims.

EXAMPLE 1

2,3,3a,4,5,7,8,9,9aβ,9bα-decahydro-3aβ-methyl-1H-cyclopenta[a]naphthalene-3β,7β-diol (II)

To a well stirred solution of 9 g. of the known compound anti-trans - 1β - hydroxy - 8β - methyl-4,5-(4-keto-1,2,3,4-tetrahydrobenzo)-hydrindane (I) in 180 ml. of tetrahydrofuran, 18 g. of powdered lithium aluminum tritertiarybutoxy hydride was added. At the end of 5 hours the mixture was poured into a saturated solution of ammonium chloride and water. The inorganic gel was removed by filtration through Celite (diatomaceous earth). The organic layer was separated, washed with water and brine and evaporated to dryness under vacuum. The residual solid was rerystallized from ethyl acetate:cyclohexane to give 8.31 g. of 2,3,3a,4,5,7,8,9,9a$\beta$,9b$\alpha$-decahydro-3a$\beta$-methyl-1H-cyclopenta[a]naphthalene - 3$\beta$,7$\beta$-diol (II) having a melting point of 133 to 139° C. The analytical sample from an earlier run melted at 134 to 138° C.

*Analysis.*—Calcd. for $C_{14}H_{22}O_2$ (percent): C, 75.63; H, 9.97. Found (percent): C, 75.64; H, 10.22.

EXAMPLE 2

*2,3,3a,4,5,7,8,9,9a$\beta$,9b$\alpha$-decahydro-3a$\beta$-methyl-1H-cyclopenta[a]naphthalene-3$\beta$,7$\beta$-diol diacetate (III)*

A suspension of 8.31 g. of 2,3,3a,4,5,7,8,9,9a$\beta$,9b$\alpha$-decahydro - 3a$\alpha$ - methyl - 1H - cyclopenta[a]naphthalene-3$\beta$,7$\beta$-diol (II) in 20 ml. of pyridine and 40 ml. of acetic anhydride was stirred for about 45 minutes by which time all of the material (II) was in solution. The solution was allowed to stand at room temperature for about 4 hours. It was poured into ice-water and the solid that separated was collected on a filter. Two recrystallizations from petroleum ether (obtained by cooling in a freezer) gave 9.42 g. of 2,3,3a,4,5,7,8,9,9a$\beta$,9b$\alpha$-decahydro - 3a$\beta$ - methyl - 1H - cyclopenta[a]naphthalene-3$\beta$,7$\beta$-diol diacetate (III), melting at 60 to 66° C. A sample from a smaller run was recrystallized to a melting point of 65.7 to 69° C.

*Analysis.*—Calcd. for $C_{18}H_{26}O_4$ (percent): C, 70.56; H, 8.55. Found (percent): C, 70.62; H, 8.65.

Following the procedure of Example 2, but substituting for acetic anhydride another anhydride such as the propionic, butyric, capric, dodecanoic, etc., yields the corresponding dipropionate, dibutyrate, dicaproate, dodecanoate, etc., of 2,3,3a,4,5,7,8,9,9a$\beta$,9b$\alpha$ - decahydro-3a$\beta$-methyl-1H-cyclopenta[a]naphthalene-3$\beta$,7$\beta$-diol (III).

EXAMPLE 3

*2,3,3a,4,5,7,8,9,9a$\beta$,9b$\alpha$ - decahydro - 3a$\beta$ - methyl - 1H-cyclopenta[a]naphthalene - 3$\beta$,7$\beta$ - diol - 5a$\alpha$,6$\alpha$-oxide diacetate (IV)*

To an ice-cooled solution of 5 g. of 2,3,3a,4,5,7,8,9, 9a$\beta$,9b$\alpha$-decahydro - 3a$\beta$ - methyl - 1H - cyclopenta[a]naphthalene-3$\beta$,7$\beta$-diol diacetate (III) in 100 ml. of ether, 3.2 g. of m-chloroperbenzoic acid in 50 ml. of ether was added. The solution was allowed to remain at room temperature for about 72 hours and then washed successively with aqueous sodium bicarbonate solution, water and brine. The solid that remained after the solution was evaporated to dryness was recrystallized twice from Skellysolve B to give 3.73 g. of 2,3,3a,4,5,7,8,9,9a$\beta$,9b$\alpha$-decahydro-3a$\beta$-methyl - 1H - cyclopenta[a]naphthalene-3$\beta$,7$\beta$-diol-5a$\alpha$,6$\alpha$-oxide diacetate (IV), melting at 140 to 141° C. The analytical sample from another run melted at 139 to 141° C.

*Analysis.*—Calcd. for $C_{18}H_{26}O_5$ (percent): C, 67.05; H, 8.13. Found (percent): C, 66.77; H, 8.21.

Following the procedure of Example 3, but substituting for m-chlorobenzoic acid another organic peracid such as the perphthalic, peracetic, trifluoroperacetic, etc., also yields 2,3,3a,4,5,7,8,9,9a$\beta$,9b$\alpha$-decahydro-3a$\beta$-methyl-1H-cyclopenta[a]naphthalene - 3$\beta$,7$\beta$ - diol - 5a$\alpha$,6$\alpha$ - oxide diacetate (II).

Following the procedure of Example 3 but substituting for the starting material (III) employed therein, e.g., the corresponding dipropionate, dibutyrate, dicaproate, etc., yields the corresponding 3$\beta$,7$\beta$-diacylate of the compound of Formula IV.

EXAMPLE 3A

*2,3,3a,4,5,6,7,8,9,9a$\beta$,9b$\alpha$-dodecahydro-3a$\beta$,6$\beta$-dimethyl-1H - cyclopenta[a]naphthalene-3$\beta$,5$\alpha$,7$\beta$-triol (IV–A)*

To a solution of 0.65 g. of 2,3,3a,4,5,7,8,9,9a$\beta$,9b$\alpha$-decahydro-3a$\beta$-methyl - 1H - cyclopenta[a]naphthalene-3$\beta$,7$\beta$-diol-5a$\alpha$,6$\alpha$-oxide diacetate (IV), 10 ml. of 2M methylmagnesium bromide in a mixture of benzene and tetrahydrofuran was added. After about 3 hours of heating under reflux the solution was cooled in ice and 10 ml. each of saturated ammonium chloride solution, and water successively added. Ether was added and the organic layer was first washed with water and then brine. The crystalline solid that remained when the solution was evaporated to dryness was recrystallized from a mixture of acetone and cyclohexane to give 0.22 g. of 2,3,3a,4,5,6,7,8,9,9a$\beta$, 9b$\alpha$ - dodecahydro - 3a$\beta$,6$\beta$ - dimethyl-1H-cyclopenta[a] naphthalene-3$\beta$,5$\alpha$,7$\beta$-triol (IV–A), melting at 181.5 to 184° C. The nuclear magnetic resonance (NMR) spectrum shows a new methyl group as a doublet ($J$=7.5 cps. at 0.80 $\delta$).

*Analysis.*—Calcd. for $C_{12}H_{26}O_3$ (percent): C, 70.83; H, 10.30. Found (percent): C, 70.46; H, 10.64.

EXAMPLE 4

*2,3,3a,4,5,5a,6,7,8,9,9a$\beta$,9b$\alpha$ - dodecahydro- - 3a$\beta$-methyl-6$\beta$ - vinyl - 1H - cyclopenta[a]naphthalene - 3$\beta$,5$\alpha$,7$\beta$-triol (V)*

A solution of 12.2 l. of redistilled vinyl bromide in 100 ml. of tetrahydrofuran was added to 4.55 g. of magnesium over 1.5 hours with mechanical stirring. The mixture was warmed at reflux for about 30 minutes and allowed to cool to room temperature. To this Grignard reagent a solution of 5.69 g. of 2,3,3a,4,5,7,8,9,9a$\beta$,9b$\alpha$-decahydro-3a$\beta$ - methyl-1H-cyclopenta[a]naphthalene - 3$\beta$,7$\beta$ - diol-5a$\alpha$,6$\alpha$-oxide diacetate (IV) was added. The mixture was heated for about 3 hours on a steam bath with good mechanical stirring. To the mixture an iced ammonium chloride solution was added with stirring, followed by the addition of 130 ml. of methanol and 25 ml. of 5% aqueous sodium hydroxide solution. The mixture was concentrated under reduced pressure to about one third of its original volume, diluted with water and extracted with ether. The ether extract was washed successively with water, dilute hydrochloric acid, dilute aqueous sodium carbonate solution, dried over anhydrous sodium sulfate and filtered. The filtrate was evaporated to give a crude gummy product; this was dissolved in a small amount of methylene chloride and chromatographed over a column of Florisil (synthetic magnesium silicate) and eluted with a mixture of 10% acetone and 90% Skellysolve B to give fractions that crystallized upon the addition of a drop of water to each fraction. The fractions were combined and recrystallized from a mixture of acetone and cyclohexane (the crystallization being induced by the addition of a drop of water) to yield 4.74 g. of 2,3,3a,4,5,5a,6,7,8, 9,9a$\beta$,9b$\alpha$-dodecahydro-3a$\beta$-methyl-6$\beta$ - vinyl - 1H - cyclopenta[a]naphthalene-3$\beta$,5$\alpha$,7$\beta$-triol (V), having a melting point of 104 to 107° C. The analytical sample from a smaller run melted at 100° C.

*Analysis.*—Calcd. for $C_{16}H_{26}O_3 \cdot \frac{1}{2}H_2O$ (percent): C, 69.78; H, 9.88. Found (percent): C, 70.15; H, 10.00.

EXAMPLE 5

*2,3,3a,4,5,5a,6,7,8,9a$\beta$,9b$\alpha$ - dodecahydro - 3a$\beta$-methyl-6$\beta$ - oxiranyl - 1H - cyclopenta[a]naphthalene - 3$\beta$,5$\alpha$, 7$\beta$-triol (VI)*

Trifluoroperacetic acid was prepared from 12.6 ml. of trifluoroacetic anhydride and 2.06 ml. of 90% hydrogen peroxide in 25 ml. of methylene chloride. The volume of the solution was brought to 50 ml. with methylene chloride. To a mixture of 0.69 g. of 2,3,3a,4,5,5a,6,7,8,9,9a$\beta$, 9b$\alpha$-dodecahydro-3a$\beta$-methyl-6$\beta$ - vinyl - 1H - cyclopenta [a]naphthalene-3$\beta$,5$\alpha$,7$\beta$-triol (V) and 1.2 g. of sodium carbonate in 10 ml. of methylene chloride and 10 ml. of chloroform, 3 ml. of the trifluoroperacetic solution was added dropwise. After heating at reflux for about 1 hour, the mixture was allowed to cool. The solid material was separated from the mixture by filtration and the filtrate evaporated to dryness to give 0.28 g. of solid. This was collected on a filter and taken up in water and methylene chloride. The organic layer was separated and evaporated to dryness to give an additional 0.29 g. of product (VI). The organic materials were combined, dissolved in a small amount of methylene chloride, chromatographed on a column of Florisil and eluted with 30% acetone: 70% Skellysolve B to give 0.4 g. of amorphous 2,3,3a,4,5,5a,6,7,8,9,9aβ,9bα-dodecahydro-3aβ - methyl - 6β-oxiranyl-1H - cyclopenta[a]naphthalene - 3β,5α,7β - triol (VI), which showed a single spot on thin layer chromatography (TLC).

EXAMPLE 6

*1,2,3,4,5,5a8,9,9aβ,9bα - decahydro - 5aα - hydroxy - 3aβ-methyl - 6β - oxiranyl - 3H - cyclopenta[a]naphthalene-3,7(6H) dione (VII)*

To an ice-cooled solution of 0.4 g. of amorphous 2,3,3a,4,5,5a,6,7,8,9,9aβ,9bα-dodecahydro - 3aβ - methyl - 6β-oxiranyl-1H-cyclopenta[a]naphthalene - 3β,5α,7β - triol (VI) in 25 ml. of acetone, 0.75 ml. of Jones reagent (8N chromic acid in 8N sulfuric acid) was added dropwise. After about 10 minutes, the bulk of the solvent was removed with a rotary evaporator. The residue, a gum, was dissolved in water and methylene chloride: chloroform. The organic layer was washed with water, then brine, and evaporated to dryness. The residual solid was recrystallized twice from ethyl acetate:cyclohexane to give 208 mg. of 1,2,3,4,5,5a,8,9,9aβ,9bα-decahydro-5aα - hydroxy-3aβ-methyl-6β-oxiranyl - 3H - cyclopenta[a]naphthalene-3,7(6H)dione (VII), having a melting point of 172 to 174° C.; $\nu_{max.}$ 3400 cm.$^{-1}$, 1760 cm.$^{-1}$, 1725 cm.$^{-1}$. The NMR shows only 1 proton exchangeable with $D_2O$.

*Analysis.*—Calcd. for $C_{16}H_{22}O_4$ (percent): C, 69.04; H, 7.97. Found (percent): C, 68.05; H, 8.28.

EXAMPLE 7

*dl-3-oxa-norestra-1,5(10),9(11)-trien-17-one (VIII)*

A suspension of 208 mg. of 1,2,3,4,5,5a,8,9,9aβ,9bα-decahydro-5aα-hydroxy-3aβ-methyl - 6β - oxiranyl - 3H-cyclopenta[a]-naphthalene-3,7(6H) dione (VII) and 0.25 ml. of boron trifluoride etherate in 6 ml. of dry ether and 6 ml. of tetrahydrofuran was stirred at room temperature. Solution occurred in about 10 minutes and stirring was continued for about 2 hours. The solution was diluted with ether, washed successively with aqueous sodium bicarbonate solution, water and brine and evaporated to dryness. The residual solid was dissolved in a small amount of methylene chloride, chromatographed on a column of Florisil and eluted with 10% acetone:90% Skellysolve B to give 107 mg. of dl-3-oxa-norestra-1,5(10),9(11)-trien-17-one (VIII), melting at 123 to 127° C. A single recrystallization from Skellysolve B raised the melting point to 130 to 132° C. The compound's ultraviolet absorption spectrum showed $\lambda_{max.}$ 208 mμ ($\epsilon$=13,100), 237 mμ ($\epsilon$=12,250); is infrared absorption spectrum showed $\nu_{max.}$ 1730, 1645, 1615, 1510 cm.$^{-1}$; NMR:furan CH at 7.2 and 6.48 δ, 1 vinyl CH at 5.7 δ.

*Analysis.*—Calcd. for $C_{16}H_{18}O_2$ (percent: C, 79.31; H, 7.49. Found (percent): C, 78.82; H, 7.50.

EXAMPLE 8

*dl-3-oxa-A-norestra-1,5(10),9(11)-trien-17β-ol (IX)*

To a solution of 0.4 g. of dl-3-oxa-A-norestra-1,5(10),9(11)-trien-17-one (VIII) in 25 ml. of tetrahydrofuran, 0.45 g. lithium aluminum tritertiary butoxy hydride was added. After about 3 hours an additional 0.1 g. of the hydride was added. At the end of a total reaction time of about 5 hours, the solution was stirred with saturated aqueous ammonium chloride solution and ether. The solid that precipitated was removed by filtration and washed well with ether. The ethereal organic layer from the combined filtrates was separated, washed with water, brine and evaporated to dryness. A single recrystallization of the solid crystalline residue from acetone: Skellysolve B gave 0.34 g. of dl-3-oxa-A-norestra-1,5(10),9(11)-trien-17β-ol (IX), melting at 184 to 185.5° C.

*Analysis.*—Calcd. for $C_{16}H_{20}O_2$ (percent): C, 78.65; H, 8.25. Found (percent): C, 78.55; H, 8.60.

EXAMPLE 9

*dl-17α-methyl-3-oxa-A-norestra-1,5(10),9(11)-trien-17β-ol (IX)*

To a dry flask filled with nitrogen containing 0.3 g. of dl-3-oxa-A-norestra-1,5(10),9(11)-trien-17 - one (VIII), 10 ml. of a 1.4 N ether solution of methyl lithium is added. The reaction mixture is refluxed for about 1 hour and the excess methyl lithium then destroyed by the dropwise addition of water. The solution is acidified with 2 N hydrochloric acid and 1 ml. of methanol added to loosen the precipitate. The product is collected, washed with water, dried, recrystallized from moist methylene chloride to give dl-17α-methyl-3-oxa-A-norestra - 1,5(10),9(11)-trien-17β-ol (IX).

Following the procedure of Example 9 but replacing methyl lithium by ethyl lithium, propyl lithium, butyl lithium, etc., yields, respectively, dl-17α-ethyl-3-oxa-A-norestra-1,5(10),9(11)-trien-17β-ol (IX), dl-17α-propyl-3 - oxa-A-norestra - 1,5(10),9(11)-trien-17β-ol (IX), dl-17α - butyl - 3-oxa-A-norestra-1,5(10),9(11)-trien-17β-ol (IX), etc.

EXAMPLE 10

*dl-17α-methyl-3-oxa-A-norestra-1,5(10),9(11)-trien-17β-ol (IX)*

A solution of 0.3 g. of dl-3-oxa-A-norestra-1,5(10),9(11)-trien-17-one (VIII) in 10 ml. of tetrahydrofuran is added with stirring under an atmosphere of nitrogen to 3 ml. of a 3 M solution of methylmagnesium bromide in diethyl ether. The resulting mixture is distilled until the vapor temperature reaches 55° C. and the residue is then heated under reflux for approximately 4 hours. To the mixture so obtained, an iced aqueous ammonium chloride solution is added with careful stirring, followed by the addition of 15 ml. of methanol and 3 ml. of 5% aqueous sodium hydroxide solution. The mixture is stirring for several hours under nitrogen at about 40° C. and concentrated to about one third of its original volume under reduced pressure. The resulting mixture is diluted with water and extracted with ether. The ether extract is washed successively with water, dilute hydrochloric acid, dilute aqueous sodium carbonate, and water and then dried over anhydrous sodium sulfate and filtered. The filtrate is evaporated to dryness and the residue dissolved in methylene chloride and chromatographed over a column of Florisil. The column is eluted with Skellysolve B containing increasing proportions of acetone; the fractions of the eluate which on infrared absorption analysis show no C–17 carbonyl absorption are combined and evaporated to dryness. The residue is recrystallized from a mixture of acetone and Skellysolve B to give dl-17α-methyl - 3 - oxa-A-norestra - 1,5(10),9(11)-trien-17β-ol (IX).

Using the above procedure but replacing methylmagnesium bromide by ethylmagnesium bromide, isopropylmagnesium bromide, butylmagnesium bromide, etc., yields, respectively, dl - 17α - ethyl - 3 - oxa-A-norestra-1,5(10),9(11) - trien - 17β-ol (IX), dl-17α - isopropyl-3-oxa-A-norestra - 1,5(10),9(11)-trien-17β-ol (IX), dl-17α-butyl - 3-oxa-A-norestra-1,5(10),9(11)-trien-17β-ol (IX), etc.

EXAMPLE 11

*dl-17α-ethynyl-3-oxa-A-norestra-1,5(10),9(11)-trien-17-ol (X)*

To a solution of 0.4 g. of *dl*-3-oxa-A-norestra-1,5(10), 9(11)-trien-17-one (VIII) in 10 ml. of freshly distilled dimethylsulfoxide 0.4 g. of lithium acetylide:ethylene diamine complex was added. Following about 20 hours of standing at room temperature ether and saturated aqueous ammonium chloride solution were added to the reaction mixture. The organic layer was separated, washed with water, brine and evaporated to dryness. The residual foam was dissolved in solvent and chromatographed over a column containing 50 ml. of Florisil; elution was with 2% acetone in Skellysolve B. The crystalline fractions were combined and recrystallized from aqueous methanol to give 182 mg. of *dl*-17α-ethynyl-3-oxa-A-norestra-1,5 (10),9(11)-trien-17β-ol (X), having a melting point of 144 to 147° C.

Analysis.—Calcd. for $C_{18}H_{20}O_2$ (percent): C, 80.56; H, 7.51. Found (percent): C, 80.54; H, 7.73.

Following the procedure of Example 11 but substituting lithium methylacetylide:ethylene diamine complex, lithium propylacetylide:ethylene diamine complex, etc. for lithium acetylide:ethylene diamine complex yields, respectively, *dl*-17α - (1 - propynyl)-3-oxa-A-norestra-1,5(10),9(11)-trien - 17β-ol (X), dl-17α-(1-pentynyl)-3-oxa-A-norestra-1,5(10),9(11)-trien-17β-ol (X), etc.

EXAMPLE 12

*dl-17α-ethynyl-3-oxa-A-norestra-1,5(10),9(11)-trien-17β-ol (X)*

To about 30 ml. of a liquid ammonia cooled in a Dry-Ice (solid carbon dioxide)-acetone bath, 1 g. of potassium is added. Acetylene is added until the blue color disappears, then 0.3 g. of *dl*-3-oxa-A-norestra-1,5(10),9(11)-trien-17-one (VIII) in 8 ml. of dioxane is added. The resulting solution is refluxed for about ½ hour, then most of the ammonia allowed to escape. Water is added, the solution neutralized with hydrochloric acid and extracted with ether. The extracts are washed successively with dilute hydrochloric acid, water, dilute aqueous sodium bicarbonate solution, water, dried and the solvent removed. The residue is dissolved in methylene chloride and chromatographed on a column of Florisil; the fractions are eluted with methylene chloride:Skellysolve B to give *dl*-17α - ethynyl - 3-oxa-A-norestra-1,5(10),9(11)-trien-17β-ol (X).

Following the procedure of Example 12, but substituting methylacetylene (propyne), ethylacetylene (1-butyne), propylacetylene (1-pentyne), butylacetylene (1-hexyne), etc. for acetylene, yields the corresponding 17α-propynyl, butynyl, pentynyl, hexynyl, etc. derivatives of *dl*-3-oxa-A-norestra-1,5(10),9(11)-trien-17β-ol (X).

EXAMPLE 13

*dl-17α-(1-propynyl)-3-oxa-A-norestra-1,5(10), 9(11)-trien-17β-ol (X)*

Methylacetylene gas is slowly passed into 150 ml. of a 3 N ethereal solution of methylmagnesium bromide intermittently for about 96 hours, ether being added as needed to keep the volume of the solution between about 125 and 200 ml. To the aforesaid Grignard mixture, 5 g. of *dl*-3-oxa-A-norestra-1,5(10), 9(11)-trien-17-one (VIII) in 300 ml. of purified tetrahydrofuran is added. The reaction mixture is distilled until the vapor temperature reaches 50 to 55° C., then refluxed for about 20 hours. It is then poured into a mixture of ice and aqueous ammonium chloride solution and extracted with ether. The ether extract is washed first with aqueous ammonium chloride solution, then water, dried over sodium sulfate, filtered and concentrated to dryness. The product (X) is chromatographed through a column of alumina (Grade II) neutral, to separate it from unreacted starting material (VIII). Recrystallization from a mixture of acetone and Skellysolve B yields *dl*-17α-(propynyl)-3-oxa-A-nor-estra-1,5(10),9(11)-trien-17β-ol (X).

Following the procedure of Example 13 but substituting for methylacetylene other acetylenes such as the following:

(1) acetylene,
(2) ethylacetylene,
(3) propylacetylene,
(4) butylacetylene, etc., yields, respectively, (1) *dl*-17α-ethynyl-3-oxa-A-norestra-1,5(10),9(11)-trien-17β-ol (X)
(2) *dl*-17α-(1-butynyl)-3-oxa-A-norestra-1,5(10),9(11)-trien-17β-ol (X)
(3) *dl*-17α-(1-pentynyl)-3-oxa-A-norestra-1,5-(10),9(11)-trien-17β-ol (X),
(4) *dl*-17α-(1-hexynyl)-3-oxa-A-norestra-1,5(10),9(11)-trien-17β-ol (X), etc.

EXAMPLE 14

*dl-3-oxa-A-norestra-1,5(10)-dien-17β-ol (XI)*

A solution of 120 mg. of *dl*-3-oxa-A-norestra-1,5(10), 9(11)-trien-17β-ol (IX) and 0.3 ml. of tert. butyl alcohol in 5 ml. of tetrahydrofuran was added to 10 ml. of redistilled liquid ammonia. Small portions of lithium metal amounting to 20 mg. was added thereto. When the blue color of the reaction mixture had faded (after about 1 hour), 1 g. of ammonium chloride was added. The ammonia was evaporated under a stream of nitrogen and the residue dissolved in methylene chloride and water. The organic layer was washed first with water then brine and evaporated to dryness to give the crude product (XI), which melted at 116 to 160° C. This material is carefully chromatographed and those fractions lacking NMR peaks at 6.3 to 6.7δ combined. Further chromatography, followed by recrystallization from ether:ligroin gives the desired product, *dl*-3-oxa-A-norestra-1,5(10)-dien-17β-ol (XI).

Following the procedure of Example 14, but substituting for *dl*-3-oxa-A-norestra-1,5(10),9(11)-trien-17β-ol (IX) other representative starting materials such as:

(1) *dl*-17α-methyl-3-oxa-A-norestra-1,5(10),9(11)-triene-17β-ol (IX),
(2) *dl*-17α-ethyl-3-oxa-A-norestra-1,5(10),9(11)-triene-17β-ol (IX),
(3) *dl*-17α-isopropyl-3-oxa-A-norestra-1,5(10),9(11)-triene 17β-ol (IX),
(4) *dl*-17α-butyl-3-oxa-A-norestra-1,5(10),9(11)-triene-17β-ol (IX), etc., yields, respectively, (1) *dl*-17α-methyl-3-oxa-A-norestra-1,5(10)-diene-17β-ol (XI),
(2) *dl*-17α-ethyl-3-oxa-A-norestra-1,5(10)-dien-17β-ol (XI),
(3) *dl*-17α-isopropyl-3-oxa-A-norestra-1,5(10)-dien-17β-ol (XI),
(4) *dl*-17β-butyl-3-oxa-A-norestra-1,5(10)-diene-17β-ol (XI), etc.

EXAMPLE 15

*dl-3-oxa-A-norestra-1,5(10)-dien-17-one (XII)*

To an ice cooled solution of 0.4 g. of *dl*-3-oxa-A-norestra-1,5(10)-dien-17β-ol (XI) in 25 ml. of acetone, 0.75 ml. of Jones reagent (8 N chromic acid in 8 N sulfuric acid) is added dropwise. After about 10 minutes, the bulk of the solvent is removed with a rotary evaporator. The residue is dissolved in water and methylene chloride:chloroform. The organic layer is washed with water, then brine, and evaporated to dryness. The residual solid is recrystallized twice from ethyl acetate:cyclohexane to give *dl*-3-oxa-A-norestra-1,5(10)-dien-17-one (XII).

EXAMPLE 16

*dl-17β-ethynyl-3-oxa-A-norestra-1,5(10)-dien-17β-ol (XIII)*

To a solution of 0.4 g. of *dl*-3-oxa-A-norestra-1,5(10)-dien-17-one (XII) in 10 ml. of freshly distilled dimethylsulfoxide, 0.4 g. of lithium acetylide:ethylene diamine complex is added. Following about 20 hours at room temperature, ether and saturated aqueous ammonium chloride solution is added to the reaction mixture. The organic layer is separated, washed with water, brine and evaporated to dryness. The residue is dissolved in methylene chloride and chromatographed over a 50 ml. column of Florisil. The column is eluted with 20% acetone:80% Skellysolve B. The crystalline fractions are combined and recrystallized from aqueous methanol to give *dl*-17α-ethynyl-3-oxa-A-norestra-1,5(10)-dien-17β-ol (XIII).

Following the procedure of Example 16 but substituting lithium methylacetylide:ethylene diamine complex, lithium propylacetylide:ethylene diamine complex, etc. for lithium acetylide:ethylene diamine complex, yields, respectively, *dl*-17α-(1-propynyl)-3-oxa-A-norestra-1,5(10) - dien-17β-ol (XIII), *dl*-17α-(1-pentynyl)-3-oxa-A-norestra-1,5(10)-dien-17β-ol (XIII), etc.

EXAMPLE 17

*dl-17α-ethynyl-3-oxa-A-norestra-1,5(10)-dien-17β-ol (XIII)*

To about 30 ml. of liquid ammonia cooled in a bath of Dry-Ice and acetone, 1 g. of potassium is added. Acetylene is added until the blue color disappears, then 0.3 g. of *dl*-3-oxa-A-norestra-1,5(10)-dien-17-one (XII) in 8 ml. of dioxane is added. The resulting solution is refluxed for about ½ hour, then most of the ammonia allowed to escape. Water is added, the solution neutralized with dilute hydrochloric acid, and extracted with ether. The ether extract is washed with water, dilute aqueous sodium bicarbonate solution, water, dried and the solvent removed. The residue is dissolved in methylene chloride and chromatographed on a column of Florisil; the fractions are eluted with methylene chloride:Skellysolve B to give *dl*-17α-ethynyl-3-oxa-A-norestra-1,5(10)-dien-17β-ol (XIII).

Following the procedure of Example 17, but substituting methylacetylene, ethylacetylene, propylacetylene, butylacetylene, etc. for acetylene, yields the corresponding 17α-propynyl, butynyl, pentynyl, hexynyl, etc. derivatives of *dl*-3-oxa-A-norestra-1,5(10)-dien-17β-ol (XIII).

EXAMPLE 18

*dl-17α-(1-propynyl)-3-oxa-A-norestra-1,5(10)-dien-17β-ol (XIII)*

Methylacetylene gas is slowly passed into 150 ml. of a 3 N ethereal solution of methylmagnesium bromide intermittently for about 96 hours, ether being added as needed to keep the volume of the solution between about 125 and 200 ml. To the aforesaid Grignard mixture, 5 g. of *dl*-3-oxa-A-norestra-1,5(10)-dien-17-one (XII) in 300 ml. of purified tetrahydrofuran is added. The reaction mixture is distilled until the vapor temperature reaches 50 to 55° C., then refluxed for about 20 hours. It is then poured into a mixture of ice and aqueous ammonium chloride solution and extracted with ether. The ether extract is washed first with aqueous ammonium chloride solution, then water, dried over sodium sulfate, filtered and concentrated to dryness. The product (XIII) is chromatographed through a column of alumina (Grade 11) neutral, to separate it from unreacted starting material (XII). Recrystallization from a mixture of acetone and Skellysolve B yields *dl*-(1-propynyl)-3-oxa - A - norestra-1,5(10)-dien-17β-ol (XIII).

Following the procedure of Example 18 but substituting for methylacetylene other acetylenes such as the following:

(1) acetylene,
(2) ethylacetylene,
(3) propylacetylene,
(4) butylacetylene, etc.

yields, respectively, (1) *dl*-17α-ethynyl-3-oxa-A-norestra-1,5(10)-dien-17β-ol (XIII),
(2) *dl*-17α-(1-butynyl)-3-oxa-A-norestra-1,5(10)-dien-17β-ol (XIII),
(3) *dl*-17α-(1-pentynyl)-3-oxa-A-norestra-1,5(10)-dien-17β-ol (XIII),
(4) *dl*-17α-(1-hexynyl)-3-oxa-A-norestra-1,5(10)-dien-17β-ol (XIII), etc.

I claim:
1. A racemic compound of the formula

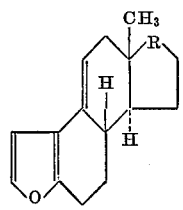

wherein R is selected from the group consisting of

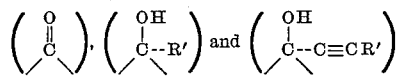

wherein R' is selected from the group consisting of hydrogen and alkyl of from one through four carbon atoms, and the *d* and *l* forms and mixtures thereof.

2. A compound of claim 1 wherein R is

namely, *dl*-3-oxa-A-norestra-1,5(10),9(11)-trien-17 - one having the formula

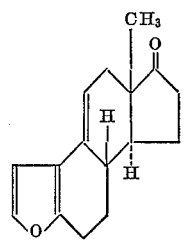

3. A compound of claim 1 wherein R is

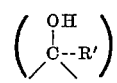

wherein R' is hydrogen, namely, *dl*-3-oxa-A-norestra-1,5(10),9(11)-trien-17β-ol having the formula

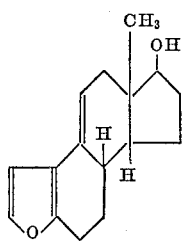

4. A compound of claim 1 wherein R is

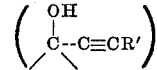

wherein R' is hydrogen, namely, *dl*-17α-ethynyl-3-oxa-A-norestra-1,5(10),9(11)-trien-17β-ol having the formula

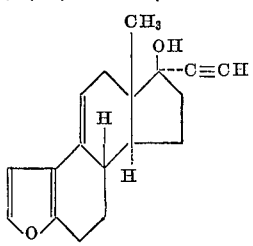

5. A process for the production of the racemic compound of claim 2 of the Formula VIII

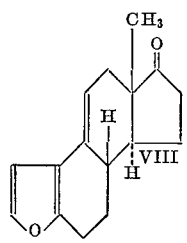

which comprises subjecting to rearrangement in the presence of a Lewis acid catalyst the racemic compound of the Formula VII

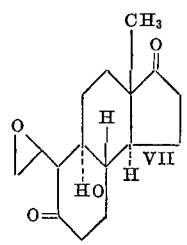

6. A racemic compound of the formula

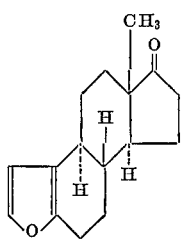

wherein R is selected from the group consisting of

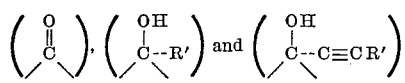

wherein R' is selected from the group consisting of hydrogen and alkyl of from one through four carbon atoms, and the *d* and *l* forms and mixtures thereof.

7. A compound of claim 6 wherein R is

namely *dl* - 3 - oxa - A-norestra-1,5(10)-dien-17-one having the formula

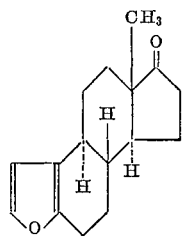

8. A compound of claim 6 wherein R is

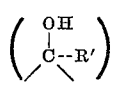

wherein R' is hydrogen, namely, *dl* - 3 - oxa - A-norestra-1,5(10)-dien-17β-ol having the formula

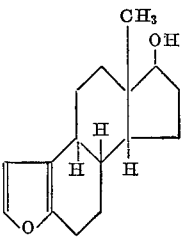

9. A compound of claim 6 wherein R is

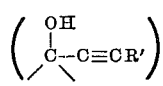

wherein R' is hydrogen, namely, *dl* - 17α-ethynyl - 3 - oxa-A-norestra-1,5(10)-dien-17β-ol having the formula

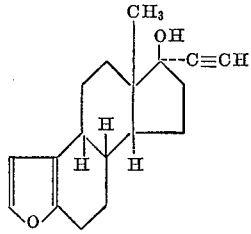

References Cited

UNITED STATES PATENTS 3,420,855  1/1969  Levine _____ 260—346.2

ALEX MAZEL, Primary Examiner

B. I. DENTZ, Assistant Examiner

U.S. Cl. X.R.

260—348, 617, 488; 424—285

UNITED STATES PATENT OFFICE
CERTIFICATE OF CORRECTION

Patent No. 3,539,596          Dated January 15, 1968

Inventor(s) Daniel Lednicer

It is certified that error appears in the above-identified patent and that said Letters Patent are hereby corrected as shown below:

Column 13, line 71, for "Grade 11" read -- Grade II --.
Column 15, line 44, formula should read:

-- 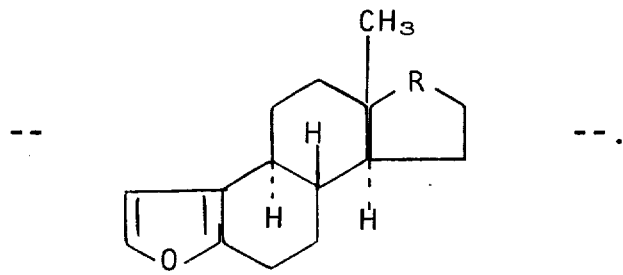 --.

FEB 9 1971

(SEAL)
Attest:

Edward M. Fletcher, Jr.
Attesting Officer

WILLIAM E. SCHUYLER, JR
Commissioner of Patents